Figure 3:
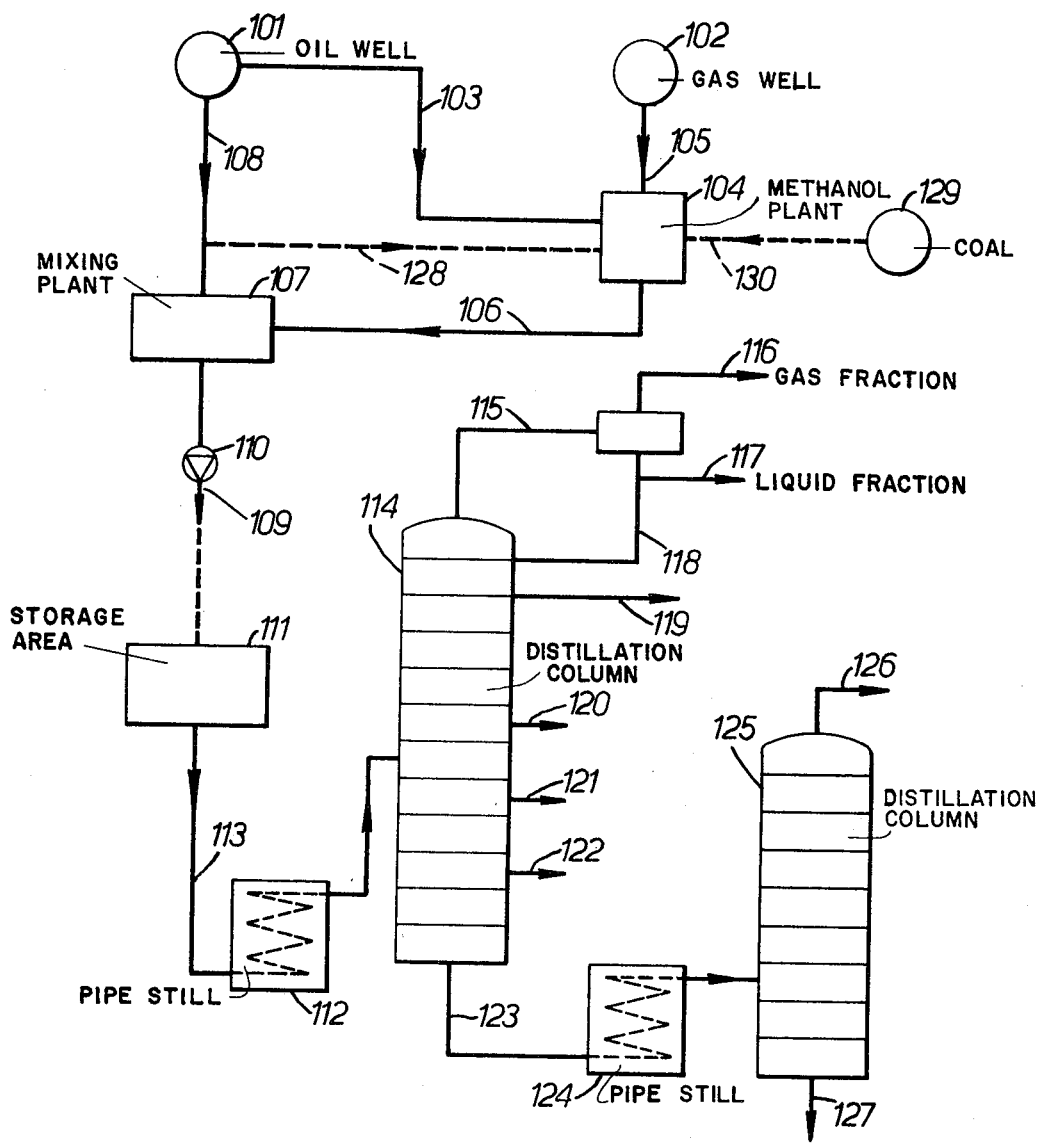

United States Patent [19]

Gruber et al.

[11] 4,243,493

[45] Jan. 6, 1981

[54] PROCESS FOR TRANSPORTATION AND DISTILLATION OF PETROLEUM WITH METHANOL

[75] Inventors: Kurt Gruber, Monchen-Gladbach; Willi Keim, Aachen-Walheim; Klaus Hentschel, Hanau-Gross Auheim, all of Fed. Rep. of Germany

[73] Assignee: Mannesmannröhren-Werke A.G., Düsseldorf, Fed. Rep. of Germany

[21] Appl. No.: 874,760

[22] Filed: Feb. 3, 1978

Related U.S. Application Data

[63] Continuation of Ser. No. 645,305, Dec. 29, 1975, abandoned.

[51] Int. Cl.$^3$ ............... B01D 3/36; C10G 7/00; F17D 1/16
[52] U.S. Cl. ................................ 203/66; 203/38; 44/56; 62/55; 137/13; 208/348; 260/449.5
[58] Field of Search ............... 203/66, 38, 68-70, 203/55; 44/56; 208/347, 348, 370; 137/13; 62/55; 302/66; 260/449.5

[56] References Cited

U.S. PATENT DOCUMENTS

| 1,079,004 | 11/1913 | Golodetz | 203/66 |
| 1,372,465 | 3/1921 | Stevens | 44/56 |
| 1,516,907 | 11/1924 | Backhaus | 44/56 |
| 2,428,467 | 10/1947 | Petry | 203/66 |
| 2,581,344 | 1/1952 | Anderson | 203/66 |
| 2,618,591 | 11/1952 | Anderson | 203/66 |
| 3,036,902 | 5/1962 | Hammer et al. | 44/56 |
| 3,284,348 | 11/1966 | Hutton | 208/348 |
| 3,926,203 | 12/1975 | Marsden et al. | 137/13 |
| 4,027,688 | 6/1977 | Gruber et al. | 137/13 |

FOREIGN PATENT DOCUMENTS

51837  10/1966  Poland .................................. 203/66

OTHER PUBLICATIONS

Horsley: Azeotropic Data-III, pp. 74-83, Wash., D.C., 1973.

Primary Examiner—Wilbur L. Bascomb, Jr.
Attorney, Agent, or Firm—Brisebois & Kruger

[57] ABSTRACT

An improved petroleum distillation process in which methanol is added to the petroleum to be distilled and methanol/hydrocarbon azeotrope is recovered boiling at about 63° C. which can be used as a fuel. The methanol can be derived from natural gas or another fossil fuel source. A methanol crude oil emulsion from a long distance pipeline can be distilled by this process without preliminary treatment.

6 Claims, 3 Drawing Figures

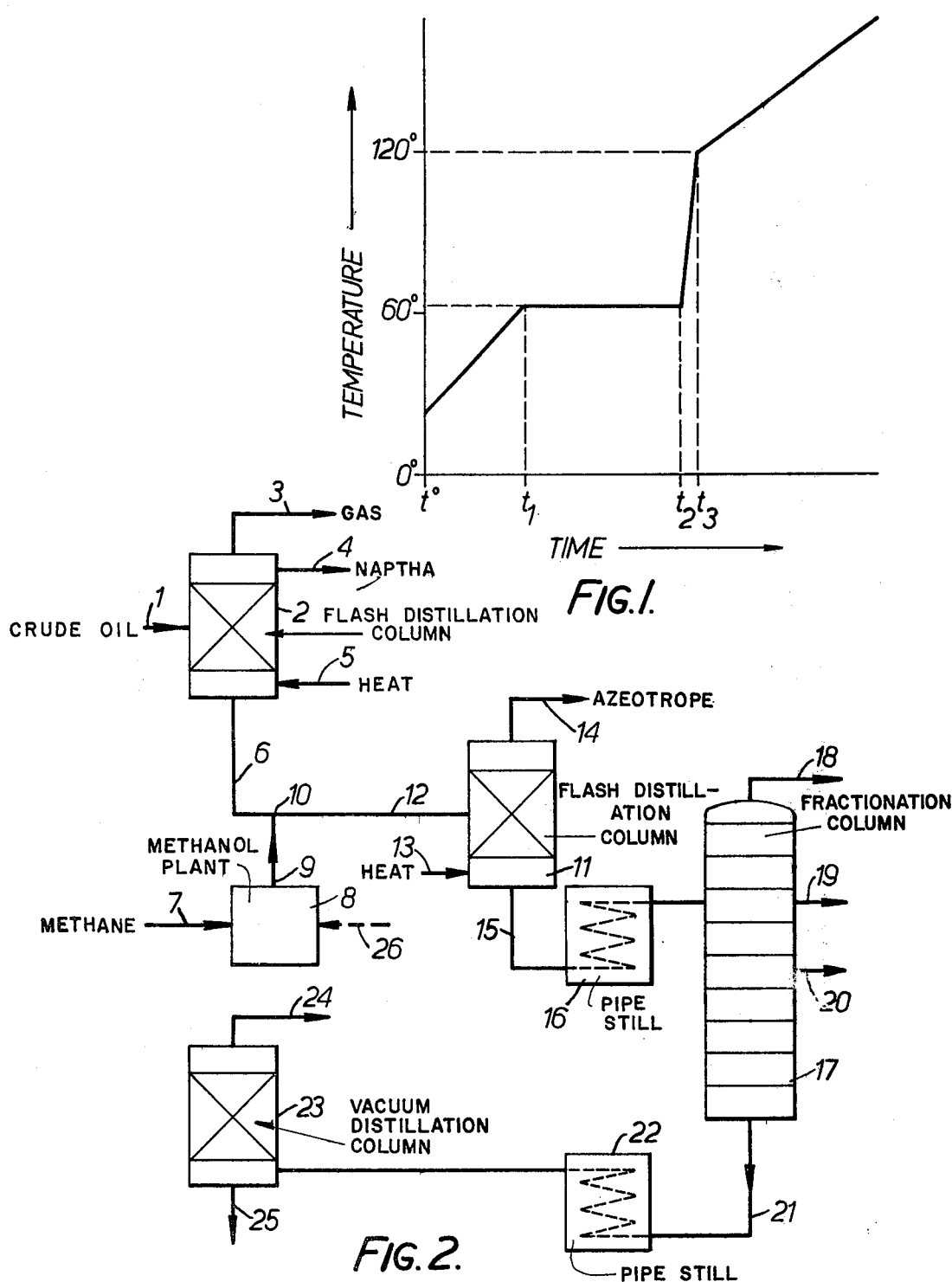

PROCESS FOR TRANSPORTATION AND DISTILLATION OF PETROLEUM WITH METHANOL

This is a continuation of application Ser. No. 645,305, filed Dec. 29, 1975, and now abandoned.

This invention relates to a process for the distillation of petroleum.

It is known that petroleum as obtained from oil wells, tar sands, shale rock or the like is not a substance which chemically is homogeneous, but is composed of individual hydrocarbon groups which differ in structure. Thus petroleum can be distilled by constant supply of heat and as a consequence is split into fractions of different boiling ranges, from normal temperature up to about 350°. This distillation of petroleum is generally known and has for a long time been part of the prior art. The proportion of the different hydrocarbons present in the petroleum depends on the petroleum deposit and differs from one deposit to another. It determines essentially the amount of distillate of a certain temperature range, for example, the hydrocarbon fraction 70/120 (boiling range between 70° C. and 120° C.). It is this fraction which is essentially used as a fuel for motor vehicles.

The effects of a looming scarcity of energy, on the one hand, and the pollutant exhaust gases which occur when hydrocarbons are burnt in engines of motor vehicles, on the other hand, have led to strenuous efforts to replace the products obtained by distillation from petroleum by other fuels. There have also been efforts to develop hydrocarbon fuels so that they are more favourable as regards environmental conditions, by avoiding certain properties, for example, by avoiding a particularly high octane number. Methanol ($CH_3OH$) has been discussed as substitute for the conventional petrol or diesel fuels for private cars, but is has not been possible for methanol to be directly used as fuel for conventional petrol engines because of its unfavourable ignition and burning behaviour.

It is an object of the invention to take these requirements into account at the time of distilling petroleum and as a consequence to improve the energy balance with the distillation of petroleum. The energy which has to be applied for carrying our the distillation of petroleum, which at atmospheric pressure may require temperatures of up to approximately 350° C., is essentially determined by the heat quantity for vaporizing the liquid boiling up to this temperature, it being additionally necessary to supply a heat quantity corresponding to the heat loss. These heat losses rise as the distillation temperature is increased.

It is therefore proposed in accordance with the invention that methanol ($CH_3OH$) is added to the petroleum.

Thus in accordance with the invention there is provided in a distillation process in which a material selected from crude petroleum and partially purified petroleum products is distilled and one or more liquid distillate fractions are collected having boiling points at atmospheric pressure up to about 350° C., The improvement which comprises distilling the material in the presence of methanol and collecting a methanol containing distillate fraction. The addition of the methanol can already take place prior to the distillation. However, it is also possible for the methanol, advantageously preheated to about 60° C., to be added during the distillation in the appropriate distillation phase. Such a procedure is particularly possible when there is a methanol plant in the immediate vicinity of the distillation plant, so that the methanol forming in the hot state in the methanol plant can be added directly and without any cooling.

It is further proposed that the temperature curve with normal pressure distillation is arranged to rise up to the boiling point of the azeotrope methanol/hydrocarbon fraction 70/130 (i.e. the fraction boiling at 70° C. to 130° C. at atmospheric pressure) and is then kept constant until the methanol-containing fraction is completely distilled off.

The quantity of methanol to be added to the petroleum determines the properties of the distillate which forms at the boiling point of the azeotrope, this temperature being at approximately 63° C. If a certain composition is not reached in such a case, then it is proposed in accordance with one form of the process of the invention that the quantity of methanol to be added to the petroleum corresponds approximately to the proportion of hydrocarbons which boil without addition of methanol up to 120° C. In this way essentially all the hydrocarbons boiling in the range of from about 70° C. to about 120° C. at atmospheric pressure can be removed in the methanol-containing azeotrope.

If it is desired to have a certain methanol content in the distillate, then it is proposed that the quantity of methanol to be added to the petroleum is adapted to a prescribed methanol content of the methanol-containing distillate.

The amount of methanol to be used can vary within wide limits, e.g. from about 95% methanol to about 5% methanol by weight based on the weight of petroleum. However it will usually be preferred to work with less than about 50% of methanol by weight based on the weight of petroleum; typically one will work with 30% or less, e.g. between about 5 and about 25%, of methanol. The proportion of methanol may, as already mentioned be related to the size of the hydrocarbon fraction 70/120, e.g. about 10% thereof by weight to about 40%, or more particularly about 20% by weight of that fraction.

The material supplied for the distillation can be a methanol-petroleum emulsion, such as that which is formed when methanol and petroleum are transported together in a pipeline as described in our copending patent application Ser. No. 543,242 filed Jan. 22, 1975 now U.S. Pat. No. 4,027,688.

The effect which is achieved by the invention is that the energy demand necessary with the distillation of the hydrocarbon fraction 70/120 of the pure petroleum is considerably lowered by the addition of methanol. Hydrocarbons and methanol, i.e. hydrocarbons and alcohols, do in fact form azeotropic mixtures of which the properties are productive with particular effect, just in the 70/120 hydrocarbon fraction. The formation of such azeotropic mixtures between certain hydrocarbons and alcohol is known per se, because such mixtures occur when benzene ($C_6H_6$=) is mixed with ethanol, in order to remove the residual water content from the alcohol.

Using the process according to the invention, it is possible by this mixture formation for all the hydrocarbon fraction forming without methanol in the range from about 70° C. to about 120° C. to be distilled off at approximately 65° C., as a result of which it will be apparent to the skilled reader that an energy saving is obviously obtained. In addition, a reduction in the heat losses is achieved by the fact that a fraction which normally is to be distilled over a certain period of time at relatively high temperature is distilled at lower temperature. It is only after distilling off the methanol-containing fraction that the temperature rises again in order then also to cover the fractions which boil above about 120° C. FIG. 1 of the accompanying drawings shows in diagrammatic form a temperature curve which is obtained upon distilling a sample of crude petroleum in the presence of methanol at atmospheric pressure.

On commencing the distillation at the instant t°, the readily volatile constituents start to boil and are distilled off until the instant t1, which corresponds to a temperature of approximately 63° C. Certainly more heat is steadily supplied in the interval between the instants t1 and t2, but the temperature does not rise until the methanol-containing fraction is all distilled off at t2. By supply of additional heat in the period between t2 and t3, the higher hydrocarbons are now heated up to about 120° C., whereupon the distillation continues in a manner known per se.

Another technical advantage of the invention is to be seen in the distillate which forms at the boiling point of the azeotrope as a result of the distillation according to the invention, which distillate contains a higher or smaller proportion of methanol, depending on requirements, and can be used as an engine fuel. This engine fuel is characterised by particularly good anti-knock properties and, owing to its alcohol content, is environmentally acceptable. If the methanol content is not higher than 20%, the fuel can be used in petrol engines without any detectable decreases in efficiency. However, high methanol contents still lead to a fuel which can be used, although certain adaptations to the engine are necessary.

The methanol-containing fraction which is formed by the distillation can also be used for heating purposes.

Not to be under-valued is the considerable importance which the invention has acquired for separating a methanol-petroleum emulsion into exploitable products, without it being necessary for this emulsion to be broken by the addition of demulsifying agents and splitting it up into components. In certain circumstances, a very considerable formation of petroleum-methanol emulsion is to be expected when the natural gas forming in or in the vicinity of a petroleum deposit is converted into methanol and is admixed with the petroleum for the purpose of common transport as described in our co-pending patent application Ser. No. 543,242 filed Jan. 22, 1975 now U.S. Pat. No. 4,027,688.

FIGS. 2 and 3 of the accompanying drawings are diagrammatic flow sheets illustrating the application of the invention to continuous distillation processes.

In the plant shown in FIG. 2 crude oil is supplied through a line 1 to a first "flash distillation" column 2. Gas, consisting essentially of a mixture of $C_2$ to $C_4$ hydrocarbons, is removed overhead by line 3, whilst a light naphtha fraction, having a boiling point of less than 70° C. at atmospheric pressure, is removed by line 4. Heat from the distillation is supplied as indicated by the arrow 5. The bottom fraction from column 2, i.e. all that part of the petroleum having a boiling point at atmospheric pressure of 70° C. or more, is removed by line 6. Methane from a convenient source, e.g. a natural gas well, is supplied by line 7 to a methanol plant 8 of conventional design. Methanol leaves the plant 8 via line 9 at a temperature of 60° C. and is mixed at point 10 in appropriate proportion with the bottom fraction from the first "flash distillation" column 2. The resulting methanol/petroleum mixture is fed to a second "flash distillation" column 11 via line 12. Heat is supplied to column 11 as indicated by arrow 13. A methanol/hydrocarbon azeotrope boiling at 63° C. at atmospheric pressure is removed overhead from column 11 by line 14. The bottoms from column 11 are essentially free from methanol and pass along line 15 to a pipe still 16 where they are further heated and pass to a fractionation column 17. A high boiling petrol fraction ($b_p$ about 120° to 200° C. at atmospheric pressure) is removed from the top of column 17 by line 18. Other higher boiling fractions such as heating oils (having a boiling point range of about 200° to about 300° C. at atmospheric pressure) and gas oil (having a boiling point range of about 300° to 350° C. at atmospheric pressure) are taken off by lines 19 and 20 respectively. The bottom fraction, boiling at about 350° C. or higher at atmospheric pressure, is removed via line 21 and passes to a further pipe still 22 in which it is further heated. The hot residue then passes to a vacuum distillation column 23 in which a heavy gas oil fraction is removed overhead by line 29, while an asphalt fraction is removed by line 25.

Instead of supplying natural gas via line 7 to the methanol plant, coal or crude oil or another fossil fuel or a derivative thereof or a mixture of two or more thereof can be supplied to the plant via line 26.

In FIG. 3 there is shown a flow sheet illustrating the path of crude petroleum from the wellhead to the refinery and its distillation. Reference numeral 101 indicates an oil well and reference numeral 102 a gas well. Petroleum is separated from natural gas at the wallhead of oil well 101, the natural gas being passed along line 103 to a methanol plant 104 of conventional design in which the natural gas is converted to methanol. Gas from gas well 102 flows to methanol plant 104 along line 105. Methanol from plant 104 is conducted via line 106 to a mixing plant 107 where it is mixed with petroleum from well 101 supplied along line 108 and forms a methanol-crude petroleum emulsion. An emulsion stabiliser may be added if desired but this may not be necessary.

From mixing plant 107 the resulting emulsion is pumped along pipe line 109 by pumping station 110. Further pumping stations (not shown) may be provided at intervals along the pipeline. Pipeline 109 may lead directly to a refinery but, more usually, it leads to a tanker terminal or railhead at which the methanol is transferred to tankers or rail cars, as the case may be, for onward transport to the refinery.

Reference numeral 111 indicates a storage area for the emulsion. From storage area 111 the emulsion is fed to a direct-fired pipe still 112 via line 113 and to distillation column 114 operating at atmospheric pressure. An overhead fraction is taken off by lines 115 which is separated into a gas fraction (removed by line 116) and a low-boiling liquid fraction (light naphtha), part of which is removed by line 117 and part of which is returned as a reflux stream to the top of the column via line 118. A methanol-containing azeotrope is removed by line 119 and higher boiling fractions (e.g. heavy naphthas, heating oils, light gas oils and medium gas oils) are removed by lines 120, 121, and 122. The residual oil passes along line 123 to a further pipe still 124 to a second distillation column 125 operating under reduced pressure. A volatile fraction (heavy gas oil) is removed overhead along line 126 while asphalt is removed along line 127.

The methanol-containing azeotrope can be used as obtained as a motor fuel or blended with further gasoline or diesel fuel. Conventional additives such as octane improvers, anti-knock additives or cetane imporous can be added if desired.

Of course other fossil fuels can be used for the production of methanol in place of all or part of the natural gas used in the flowsheet of FIG. 3 as described above. Thus, if there is no natural gas well conveniently located in the vicinity of the oil well 101 part of the oil can be passed to methanol plant 104 along line 123. Alternatively coal can be supplied to the methanol plant 104 from line 129 as indicated by line 130. Of course methanol plant 104 must be adapted to suit the particular chosen form of fossil fuel.

We claim:

1. In a process for the production of petroleum products which includes the steps of recovering crude petroleum from an oil well, transporting recovered crude petroleum to a refinery location remote from the oil well, refining crude petroleum at the refinery location, and recovering a petroleum distillate fraction having utility as a motor fuel, and wherein a difficult to transport fossil fuel selected from natural gas, coal and a difficult to transport crude petroleum is available in the vicinity of the oil well, the improvement comprising converting said difficult to transport fossil fuel to methanol, admixing the resulting methanol with recovered crude petroleum in an amount to form a stable, pumpable emulsion consisting essentially of only methanol and crude petroleum, transporting the recovered crude petroleum to the remote refinery location in the form of said stable, pumpable, methanol-crude petroleum emulsion, breaking the emulsion at the refinery location by distillation, and recoverying from the distillation step a methanol-hydrocarbon azeotrope fraction having utility as a motor fuel, having a boiling point of about 63° C., and containing in addition to methanol at least 50% by weight of hydrocarbons boiling in the range of from about 70° C. to about 120° C.

2. A process according to claim 1 wherein, said step of forming the stable pumpable methanol-crude petroleum emulsion comprises, admixing about 20% by weight of methanol based on the total weight of hydrocarbons boiling in the temperature range of from about 70° C. to about 120° C. at atmospheric pressure, so that the recovered hydrocarbon azeotrope fraction having a boiling of about 63° C. contains about 20% methanol.

3. In a process for the production of petroleum products which includes the steps of recovering crude petroleum from an oil well, transporting recovered crude petroleum to a refinery location remote from the oil well, refining crude petroleum at the refinery location, and recovering a petroleum distillate fraction comprising hydrocarbons boiling in the range of from about 70° C. to about 120° C. and having utility as a motor fuel, and wherein a fossil fuel selected from coal, natural gas and crude petroleum is available in the vicinity of the oil well, the improvement comprising converting said fossil fuel to methanol, admixing the resulting methanol with crude petroleum to form a stable, pumpable methanol-crude petroleum emulsion, transporting the recovered crude petroleum to the refinery location in the form of said stable methanol-crude petroleum emulsion, breaking the emulsion at the refinery location by distillation in a distillation zone, recovering from the distillation zone a methanol-hydrocarbon azeotrope fraction comprising methanol and hydrocarbons which boil in the range of from about 70° C. to about 120° C., said azeotrope fraction having a boiling point of about 63° C. and having utility as a motor fuel, and controlling the amount of the methanol in the methanol-crude petroleum emulstion introduced into the distillation zone so as to correspond approximately to the proportion of hydrocarbons present in the crude petroleum that boil in the range of from about 70° C. to about 120° C., whereby essentially all the hydrocarbons present in the crude petroleum that boil in the range of from about 70° C. to about 120° C. appear in said methanol-hydrocarbon azeotrope fraction.

4. A process according to claim 3, in which distillation is effected by supplying heat at a substantially constant rate.

5. A process according to claim 3, in which heat is supplied to the distillation vessel at a substantially constant rate during collection of the methanol-containing distillate fraction.

6. A process according to claim 3, in which the proportion of methanol is so chosen that distillation is carried out in the presence of about 20 weight % of methanol based upon the total weight of hydrocarbons boiling in the temperature range of from about 70° C. to about 120° C. at atmospheric pressure.

* * * * *